March 24, 1964  J. W. JOHANNSON  3,126,518
ADJUSTABLE TEMPERATURE COMPENSATED TRANSDUCER
Filed April 18, 1960
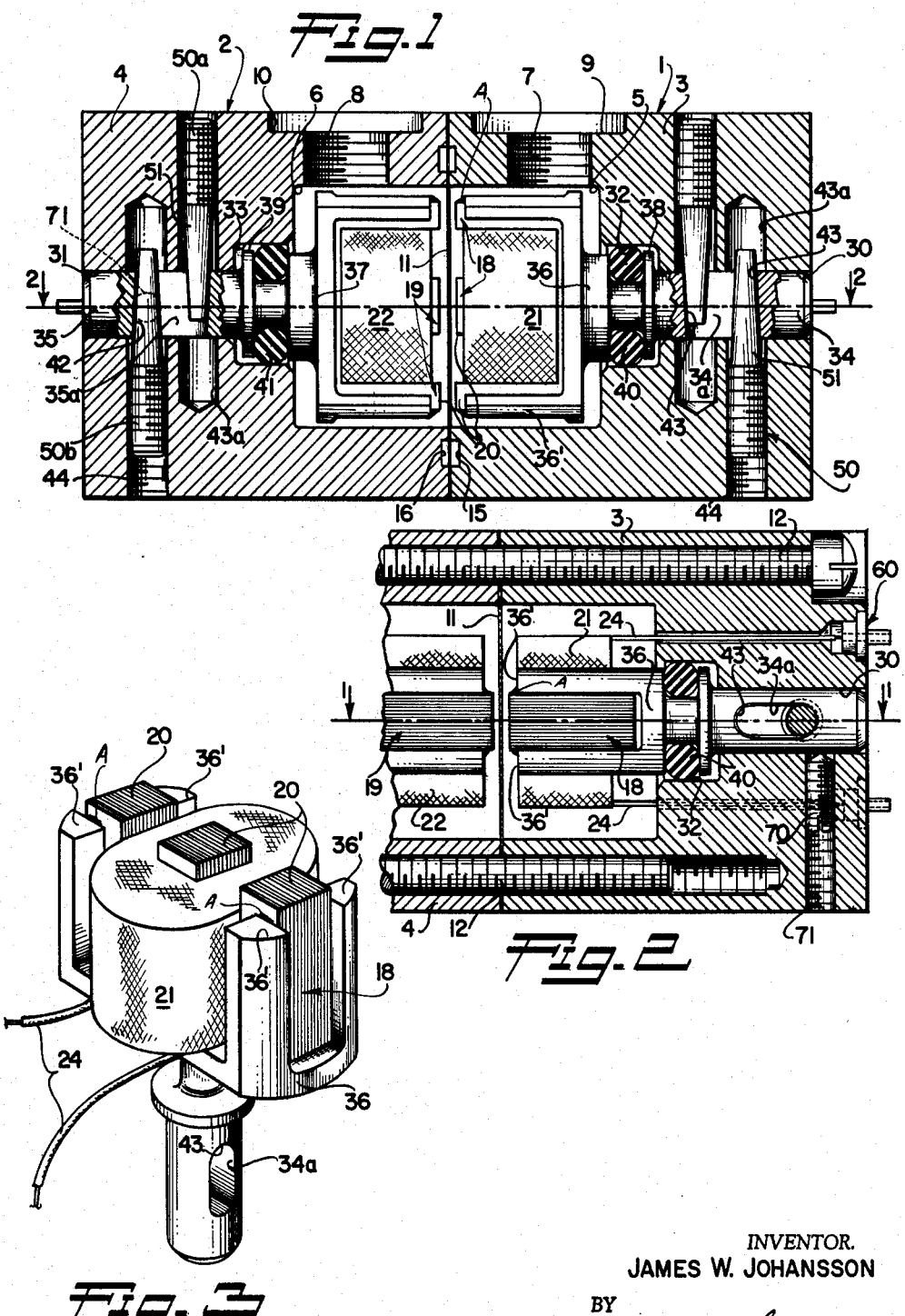
INVENTOR.
JAMES W. JOHANSSON
BY
George Sullivan
Agent United States Patent Office 3,126,518
Patented Mar. 24, 1964

3,126,518
ADJUSTABLE TEMPERATURE COMPENSATED
TRANSDUCER
James W. Johannson, Panorama City, Calif., assignor to
Lockheed Aircraft Corporation, Burbank, Calif.
Filed Apr. 18, 1960, Ser. No. 23,096
5 Claims. (Cl. 336—30)

This invention relates generally to a metering device and more particularly to a pressure, temperature and acceleration sensitive transducer that is easily adjustable to cover a wide area of working ranges. The present application is a continuation in part of my co-pending application, Serial Number 760,284, filed September 5, 1958, now Patent No. 3,070,765, and assigned to the same assignee.

Transducers of this type are utilized where it is necessary to determine the pressure or temperature of a substance, usually gas or liquid, at a given point which would often be otherwise inaccessible, the device providing a means for translating the pressure or temperature reading into another energy system usually electrical, which can be metered at a distance.

Various types of transducers have been developed utilizing, among others, variable reluctance and variable resistance principles. The present invention is directed to an improvement in the former type device known in the art as an E-core transducer but as will be apparent has equal adaptability with other types of transducer units.

In missile and other types of instrumentation programs, changes are often made in physical parameters and ranges of operation after the basic programs have substantially progressed. In the particular case of pressure and accelerometer transducers, this means that considerable time and money must be expended in producing new equipment that would not only be compatible with the telemetering system employed but will be sensitive to and workable within the operating ranges specified. Also, a change in a major specification often results in changes in the operating limits of a large number of supporting systems and the problem is thus multiplied until it becomes a major obstacle to the advancement of the project.

In addition, such transducers normally are required to operate throughout a wide range of ambient temperatures. Seldom is it possible to predict the ambient temperature and where predictable, accurate calibration is required to provide an accurate indication of the measure of pressure, temperature or acceleration.

Most of these difficulties could logically be solved by the production of a transducer that is adjustable over a wide choice of ranges, and which is essentially insensitive to changes in the ambient temperature which cause error in the transducer output due to undesired temperature expansion. Various solutions to this problem have been proposed but each has been unacceptable due to instability, sensitivity to temperature extreme, and inability to operate constantly when subjected to shock cycles of temperature and vibration.

It is, therefore, a primary object of the present invention to provide a readily adjustable transducer which is relatively insensitive to undesired temperature variations.

Another object of the invention is to provide a temperature compensated transducer which can be easily altered and calibrated over a wide range of physical parameters that will result in a great reduction of the number of types of such devices necessary to be kept in stock for research and industrial projects.

A further object of this invention is to provide a temperature, pressure and vibration stable transducer which is insensitive to undesired temperature changes and can be adjusted without the necessity of completely disassembling the device.

An additional object of the present invention is to provide a pressure transducer which is readily adaptable to quantity manufacture and provided with novel means for eliminating undesired deviations due to temperature.

These and other objects will be apparent to those skilled in the art from the following detailed description wherein is shown and described a transducer of the variable reluctance type having a circular, or other preferred shaped, diaphragm armature. The armature is displaceable by applied pressure which results in a change in the distance of the air gap between the poles of an electromagnet and the diaphragm, this change in air gap being reflected as a change in inductance of an A.C. bridge circuit made up of the two transducer coils and two external resistors.

With particular reference to the drawings, wherein like reference characters denote like parts throughout, FIGURE 1 is a side elevational view shown in secton on a line taken through the center of the device;

FIGURE 2 is a top plan view in section taken along the line 2—2 of FIGURE 1;

FIGURE 3 is a perspective view of the adjustable shaft assembly of FIGURES 1 and 2 showing a preferred embodiment of the invention.

Referring specifically to the sectional representation of FIGURE 1, the preferred embodiment of the transducer is shown composed of identical units or halves generally indicated as 1 and 2. It should be obvious that the objects of the invention would be fulfilled by providing a single unit assembly. However, such a single unit type transducer would not have the characteristics of linearity and accuracy provided with the double configuration. Each of the assemblies 1 and 2 respectively are composed of housings 3 and 4 having pressure chambers 5 and 6 therein. These pressure chambers are preferably cylindrical in shape but obviously may be of any other configuration. Providing for the entry of pressure into the chambers 5 and 6 are inlet ports 7 and 8. These inlet ports are preferably threaded, as shown, to receive the mating threads of inlet fittings, which may be sealed to the housings 1 and 2 by means of diaphragms or O-rings positioned in the inlet port cups 9 and 10.

Positioned between housing assemblies 1 and 2 is a flexible diaphragm 11 preferably metallic in nature and advantageously composed of the same type metal as the housings 3 and 4 in order to eliminate inaccuracies in operation due to different coefficients of expansion of the metals of the diaphragm and housing members.

It should be noted that each of the housing members 3 and 4 have an annular groove 15 and 16 in their end faces. These grooves are to provide an area into which the diaphragm may expand as the housings are sealed together by means of long shank bolts 12 shown in FIGURE 2. It is often desirable in assembling the device to provide a plating of relatively soft metal such as tin, or the like, on the faces of housings 3 and 4 and, if desired, on the mating faces of diaphragm 11. As pressure is applied sealing the housings and the diaphragm together this softer metal will tend to flow into grooves 15 and 16 and any other interstices present in the interface areas to provide a hermetic seal. This type of seal has been utilized in transducers operating under pressures of over 3000 p.s.i.

Located within each of the pressure chambers 5 and 6 is an electrical sensing device, preferably an electromagnet type. In the preferred embodiment of the invention the sensing devices are E-core electromagnets so called because of the E-shaped configuration of the laminated core members 18 and 19 having poles 20. The center poles of each of the cores 18 and 19 is wrapped with a coil 21 and 22 having leads 24 more clearly shown in FIGURE 2.

Each of the housings 3 and 4 is provided with a passageway 30 in housing 3, and 31 in housing 4, connecting pressure chambers 5 and 6 with the outer surfaces of the housings. Immediately adjacent pressure chambers 5 and 6 and connecting these chambers with the passageways 30 and 31 are enlarged intermediate chambers 32 and 33.

Slidable and adjustably journaled within passageways 30 and 31 are shafts 34 and 35 which are connected at their ends to the E-cores 18 and 19 respectively by welding, soldering, or the like.

The portions of shafts 34 and 35 which extend within intermediate chambers 32 and 33 are provided with annular enlargements 36 and 37 immediately adjacent the E-cores 18 and 19 and thinner enlargements 38 and 39 positioned near the rear or outward walls of the intermediate chambers. These enlargements 38 and 39 are only slightly less than the diameter of intermediate chambers 32 and 33. Positioned between enlargements 36—38 and 37—39 are resilient O-rings 40 and 41 of rubber or the like, journaled on the shafts 34—35 between the respective enlargements thereon, pressing against the inner surface of the intermediate chambers 32—33 to provide an hermetic seal for pressure chambers 5 and 6. As shown, the peripheries of these openings into intermediate chambers 32—33 and passageways 30—31 are chambered or rounded.

Attached to the enlargements 36—38 and integral therewith are shown a frame or "basket" each having a base and four fingers or brackets 36' extending therefrom in a predetermined spaced relation. Each E-core 18—19 is mounted within the "basket," as best shown in FIGURE 3. The E-cores are spaced from the bottom or base of the "basket" as shown in FIGURE 2 and soldered or otherwise fixed to the fingers 36' as at A in FIGURES 2 and 3. By proper selection of the location of the solder joint along the E-core, the expansion of the core due to temperature can be controlled and the air gap between the diaphragm and E-core will be independent of temperature. This type of mounting also provides superior resistance to vibration and shock.

The negative loss in modulus of elasticity due to rising temperature causes the diaphragm to increase its deflection for a given pressure. To compensate for the corresponding decrease in air gap, the near coil must be moved away from the diaphragm an equal amount. This is accomplished by the difference of the coefficient of expansion and the length of the parts of the transducer. By fabricating the transducer case and diaphragm from Carpenter Steel Co. Alloy "49" and the adjustment shafts from Invar 36 a superior transducer is obtained. The net result is a good temperature compensation over a wide temperature range. This transducer has been tested and operated from −25° F. to +500° F. with negligible deviations due to temperature.

It should be noted that the diameters of passageways 30—31 and shaft members 34—35 positioned therein, are manufactured to a close tolerance in order that the E-cores connected to the shafts will not become upset or misadjusted due to vibration or the like. The E-cores, the pressure chambers 5 and 6, and shafts 34—35 are in substantial opposed alignment in this modification.

Proceeding now with a description of the adjustment feature of this invention, reference will be made to both FIGURES 1 and 2 wherein the shafts 34—35 are provided with longitudinal slots or apertures 34a—35a. The ends of these slots are rounded as best seen in FIGURE 2 and these rounded end portions are also inclined slightly as shown at 42—43 in FIGURE 1 in order to more closely conform with the taper of the conical portions of the cams 50 described hereinbelow.

Located approximately transversely within housings 3 and 4 are opposed, offset passageways 43a which are provided throughout a substantial portion of their length with threads 44. Adjustably, threadably journaled within these passageways 43a are cam surfaces or taper-screws 50. These taper-screws are provided at their inner ends with a reduced, tapering, conical portion indicated at 51 upon each of screws 50. Manifestly, as taper-screws 50 are advanced in passageways 43a, the conical or tapered portions 51 thereof will contact and slidably bear against the inclined end portions 43 of longitudinal apertures 34a—35a. The particular tapers or angle of inclinations of the ends from the vertical could obviously be varied within a wide range depending upon the degree of adjustment desired per unit turn of the screws 50. In the modification shown, a taper of approximately 3° has been found to be desirable.

As best shown in FIGURE 2, leads 24 are brought through the housings 3 and 4 and are connected at the end surfaces thereof by means of conventional commercially available plugs shown generally at 60 and more specifically illustrated in FIGURE 4.

*Operation*

In assembling the device for operation, the E-cores with the shafts 34—35 connected thereto as previously described are inserted in the pressure chambers in housings 3 and 4 respectively with the shafts closely journaled within the passageways 30—31. Housings 3 and 4 are then assembled with a diaphragm 11 therebetween by means of screws 12 extending longitudinally of the housings at spaced points around the periphery thereof.

Screws 50 are threadably inserted within transverse passageways 43a until they extend within the longitudinal slots in shaft members 34—35. Regarding each individual E-core, adjustment is made and a desired position set by the relative placements of opposed taper-screws 50 within the housing. Thus, advancing taper-screw 50a in FIGURE 1 will tend to move E-core 19 closer to diaphragm 11 provided the taper-screw 50b is backed off a suitable distance. Thus, by operation of taper-screw 50 from the external surface of the transducer, extremely accurate adjustments may be made in the gaps between the poles of the laminated cores and the diaphragm 11.

It should be noted that an important feature of this configuration resides in the fact that pressure may be applied to the transducer while adjustments are being made by way of the set screws 50.

These adjustments are usually very small and a change in the air gap of .01″ will produce a change in electrical values sufficient to calibrate the transducer over a wide range.

The pressure chamber will remain hermetically sealed as the adjustments are made due to the particular configuration of the resilient O-rings within intermediate chambers 32—33. Although taper-screws are described above as a means of producing adjustment of the longitudinal position of shafts 34—35, it should be obvious that various other types of cam arrangements could be provided which would fall within the scope of this invention.

As noted in FIGURE 2, a set-screw 70, threadably journaled within transverse openings 71 provide for locking the adjustment of the transducer at a given position. It is understood, of course, that other locking means such as shown in the above co-pending application may be utilized if desired.

In order to provide a wide variety of operating ranges within which the device is sensitive, provision has been made for easily removing and interchanging diaphragm 11. Thus, diaphragm 11 may be replaced with more or less flexible diaphragms depending upon the range of pressures to be metered, the less flexible diaphragms producing less change in gap for a given applied pressure.

In a similar manner the device may be operated as an accelerometer merely by providing a diaphragm of heavier mass or a diaphragm with a mass attached thereto which will be effected by changes in acceleration as the device is moved. Adjustment may be made in the same manner utilizing screws 50, thus providing a variation in sensitivity within a given range of operating limits depending upon the particular type of diaphragm employed.

The device may be adapted to operate as a temperature transducer by utilizing a bimetallic diaphragm, and providing for continuous flow of fluid the temperature of which is to be measured through the transducer. Continuous flow may be obtained by providing another aperture in the wall of the transducers opposite to the parts 7 and 8. Thus, as fluids of certain temperatures flow past and contact the bimetal diaphragm, the diaphragm becomes distorted due to the different coefficients of expansion thus varying the gap between the diaphragm and the poles 20 of the electromagnet assemblies.

There has thus been provided a sensitive and accurate transducer device which is adjustable from its outer surface. Manifestly, this particular configuration eliminates the difficulties involved in partially or completely disassembling the device as has been required heretofore. At the same time a versatile unit is produced which may be varied in sensitivity over a wide variety of ranges by a simple expedient of replacing the central diaphragm. Likewise, by utilizing the coil mounting as disclosed herein, temperature expansion of the core takes place in the direction opposite to the air gap and resulting in an air gap which is independent of temperature.

While certain preferred embodiments of the invention have been specifically disclosed, it is understood that the invention is not to be limited thereto as many variations will be readily apparent to those skilled in the art and the invention is to be given the broadest interpretation within the terms of the following claims.

I claim:

1. An adjustable transducer comprising a first and second housing each having a sealed pressure chamber therein, said housings being positioned so that the pressure chamber in one is substantially aligned with the pressure chamber of the other, an interchangeable flexible metal diaphragm positioned between said housings and hermetically sealed to each, said diaphragm constituting a common dividing wall between said pressure chambers, a pressure inlet port associated with each of said chambers, an E-core electrical coil within each of said chambers, said E-core having a plurality of poles and positioned with its poles in spaced relation to said diaphragm, means for adjustably mounting said coils within said housings for moving said coils toward and away from said diaphragm, said mounting means including bracket means fixed to the poles of said E-core near the outer ends thereof and adjacent said diaphragm whereby thermal expansion of said E-core takes place opposite to said diaphragm from said ends, thereby having no effect on the air gap between said poles and said diaphragm.

2. An adjustable pressure transducer comprising a pair of housings each having a pressure chamber therein, a single flexible metallic diaphragm positioned between said housings and hermetically sealed to each, said diaphragm constituting a wall common to each of said pressure chambers, an inlet port in each housing and associated with said chambers, electrical sensing means associated with said diaphragm with each of said chambers, a separate passageway of reduced diameter connecting each pressure chamber with the external surface of said housings, a control shaft slidably journaled in said passageways, a frame having a plurality of fingers integral with the inner end of said shaft, said fingers surroundingly supporting said electrical sensing means, means for attaching the ends of said fingers to said sensing means, whereby the electrical output of said sensing means is made independent of thermal expansion within said sensing means and adjustment means in said housing associated with said control shaft for adjusting the position of said shaft in said passageway.

3. An adjustable transducer as recited in claim 2 wherein said adjustment means includes a longitudinal slot in said control shaft, and adjustable cam means extending through said slot.

4. An adjustable variable reluctance transducer comprising a pair of housings each having a pressure chamber therein, a single flexible metallic diaphragm positioned between said housings and hermetically sealed to each, said diaphragm constituting a wall common to each of said pressure chambers, an inlet port in said housings and associated with each chamber, an E-core electromagnetic sensing means within each of said chambers and having a plurality of poles, said E-core sensing means positioned with the poles in closely spaced relationship with said diaphragm, a passageway of reduced diameter connecting each of said pressure chambers with the external surfaces of their housings, a longitudinally slotted control shaft slidable journaled in each of said passageways, means for attaching said shaft to said poles at a point adjacent said diaphragm, a pair of opposed adjustable cam surfaces journaled in each of said housings and extending through the longitudinal slots in said control shafts, one cam bearing against each of said slots and locking means for securing said control shafts in a desired position.

5. In an adjustable variable reluctance pressure transducer the combination comprising a pair of housings each having a pressure chamber therein, an interchangeable flexible diaphragm positioned between said housings and hermetically sealed to each, said diaphragm constituting a wall common to each of said pressure chambers, an inlet port in said housings associated with each of said pressure chambers, an E-core electrical coil with external leads within each chamber, said E-core having a plurality of poles in juxtaposition to said diaphragm, a passageway in the end of each of said housings, intermediate chambers connecting said pressure chambers with said passageways, a longitudinally slotted control shaft slidably journaled in said passageway, a frame having a plurality of fingers integrally mounted on the inner end of said control shaft, means for fixedly attaching said E-core to the ends of said fingers, a resilient O-ring journaled on said shaft and sealingly engaged with the inner surface of said intermediate chamber, a pair of opposed tapered cam surfaces adjustably threaded in each of said housings with the tapered surfaces extending through said longitudinal slots, one surface bearing against each end thereof, and locking means for locking the adjustment of said E-core at a desired position.

References Cited in the file of this patent
UNITED STATES PATENTS

| | | |
|---|---|---|
| 2,751,530 | Armstrong | June 19, 1956 |
| 2,767,973 | Ter Veen | Oct. 23, 1956 |
| 2,882,503 | Huff | Apr. 14, 1959 |
| 2,884,608 | Jessen | Apr. 28, 1959 |
| 2,927,290 | Baker | Mar. 1, 1960 |
| 2,952,000 | Wolfe | Sept. 6, 1960 |